(12) United States Patent  
Foreman et al.

(10) Patent No.: US 8,108,816 B2
(45) Date of Patent: Jan. 31, 2012

(54) DEVICE HISTORY BASED DELAY VARIATION ADJUSTMENT DURING STATIC TIMING ANALYSIS

(75) Inventors: Eric A. Foreman, Essex Junction, VT (US); Peter A. Habitz, Essex Junction, VT (US); David J. Hathaway, Essex Junction, VT (US); Jeffrey G. Hemmett, Essex Junction, VT (US); Kerim Kalafala, Hopewell Junction, NY (US); Jeffrey P. Soreff, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 12/484,293

(22) Filed: Jun. 15, 2009

(65) Prior Publication Data

US 2010/0318951 A1    Dec. 16, 2010

(51) Int. Cl.
*G06F 17/50* (2006.01)
(52) U.S. Cl. .......... 716/108; 716/113; 716/136; 703/16
(58) Field of Classification Search ............. 716/108, 716/113, 136; 703/16
See application file for complete search history.

(56) References Cited

U.S. PATENT DOCUMENTS

| 6,476,645 | B1 | 11/2002 | Barnes |
| 6,643,804 | B1 | 11/2003 | Aipperspach et al. |
| 6,798,261 | B1 | 9/2004 | Bhushan et al. |
| 6,816,824 | B2 | 11/2004 | Chuang et al. |
| 6,833,737 | B2 | 12/2004 | Aipperspach |
| 6,960,926 | B2 | 11/2005 | Anderson et al. |
| 2002/0016705 | A1 | 2/2002 | Kroell et al. |
| 2006/0033646 | A1 | 2/2006 | Dreps et al. |
| 2006/0277513 | A1 | 12/2006 | Visweswariah |
| 2008/0068099 | A1 | 3/2008 | Bhushan et al. |

*Primary Examiner* — Phallaka Kik
(74) *Attorney, Agent, or Firm* — Ryan K. Simmons; Hoffman Warnick LLC

(57) ABSTRACT

A system and method for the adjustment of history based delay variation during static timing analysis of an integrated circuit design. The method may include obtaining information through sources of variability of history based components of delay variability, and a relationship between the sources of variability and one or more bounded device histories. Then, inputting history bounds for at least one signal of the integrated circuit design, and computing and propagating history bounds through at least one first segment of the integrated circuit design to at least one signal of the integrated circuit design. Further, the method may include evaluating from at least one of the propagated history bounds, device history bounds for at least one second segment of the integrated circuit design, and based on the evaluated device history bounds, adjusting at least one of a value of the history based delay variability and propagation of timing.

20 Claims, 3 Drawing Sheets

DEVICE HISTORY BASED DELAY VARIATION ADJUSTMENT DURING STATIC TIMING ANALYSIS

BACKGROUND

1. Technical Field

The disclosure relates generally to a system and method for static timing, and more particularly to a system and method for adjustment of modeled delay variation as a function of past device state and/or switching history during static timing analysis.

2. Background Art

One dominant form of performance analysis used during integrated circuit (IC) design is static timing analysis (STA). STA is an important process by which one identifies any circuit races/hazards which could cause a chip to malfunction, verifies the operational speed of a chip, and identifies the paths which limit the operational speed. STA typically operates on a timing graph, in which nodes represent electrical nodes (e.g., circuit pins) at which signals may make transitions at various times, and edges, or "propagate segments," representing the delays of the circuits and/or wires connecting the nodes. Although it may report performance-limiting paths, typical STA methods do not actually operate on paths (of which there may be an exponentially large number), and instead use a "block-based" approach to compute and propagate forward signal arrival times reflecting the earliest and/or latest possible times that signal transitions can occur at nodes in the timing graph. As a result, STA is extremely efficient, allowing for rapid estimation of IC timing on very large designs as compared to other approaches (e.g. transient simulation). STA also provides accurate timing estimates without any knowledge of the function of the design being timed, and therefore can operate in the absence of any specific input signals. However, this last trait makes STA particularly sensitive to delay variation resulting from the past device state and/or switching history, as it results in a lack of availability of information regarding the prior state and/or switching history of the modeled devices. The past device state and/or switching history of a device will hereafter be referred to as 'device history', or simply 'history'.

An important aspect of STA is evaluation of timing tests, which are required ordering relationships between the arrival of signals on converging paths. Common examples of timing tests are setup tests (often represented in a timing graph as "test segments"), requiring that a data signal at an input of a flip-flop or other memory element becomes stable for some setup period before the clock signal transition that stores that data (i.e., that the latest possible data transition in a clock cycle occur at least the required setup period before the earliest possible clock transition for that cycle), and hold tests, requiring that a data signal at an input of a flip-flop or other memory element remain stable for some hold period before the clock signal transition that stores that data (i.e., that the earliest possible data transition in a clock cycle occur at least the required hold period after the latest possible clock transition for the preceding clock cycle). Pairs of paths along which early and late arrival times compared in a timing test are propagated are often referred to as racing paths.

Although STA is typically performed at a particular "corner," which is a specified combination of conditions such as voltage, temperature, and manufacturing process that affect delays of circuits on a chip, local variations in these and other parameters may cause variations in delays of similar circuits in different locations on a chip. A common way to account for this variation in STA is to compute minimum and maximum delays for circuits, using minimum (or fast) delays to determine early signal arrival times and maximum (or slow) delays to determine late signal arrival times.

The aforementioned variations in device history can be one cause of such delay variation when digital IC's are manufactured using Partially Deleted (PD) Silicon on Insulator (SOI) technology, wherein the device body may be electrically insulated from the substrate. SOI technology can provide benefits such as improved performance and reduced power consumption. However, drawbacks exist as well; one in particular being that devices with PD-SOI technology suffer from a history effect, wherein the performance of a given device can be a function of the state history of that device, as the varying charge stored on the floating body of the device dynamically alters the threshold voltage of the device during operation. One related art method of reducing pessimism due to body charge in PD-SOI is described in U.S. Pat. No. 6,816,824, which also describes in more detail the manner in which the body charge varies due to changes in device state, and which is incorporated herein by reference. The '824 patent describes determining a range of possible body charge or voltage values for a device based on connectivity of a device within a circuit (in particular whether it is tied to a power supply rail), but assumes the most extreme range possible over all possible device histories, and does not consider the actual possible state histories of the device.

An alternate example of delay variation occurring as a result of device history would be switching history based temperature fluctuations. Switching of devices causes power dissipation and local self-heating of the devices (transistors and wires) conducting the switching signals. A device that switches rapidly generates more heat and will heat up relative to its neighboring devices, and this change in temperature can alter the electrical characteristics, and hence the delay, of those devices. Because heat conduction on an integrated circuit is typically slow relative to the circuit switching speeds, this local change in temperature due to switching will typically persist for several clock cycles, so the delay change of a switching event due to switching-induced self-heating will be a function of the switching history over some number of clock cycles immediately preceding the switching event.

Yet another example of delay variation due to device history is negative bias temperature instability (NBTI) in which cumulative switching over very long periods (e.g., the life of the circuit) cause degradation in the performance of PFETs. The degree of degradation depends on the cumulative number of times the device has switched. In this case, the time window over which history must be considered is much longer than for PD-SOI body history or switching-induced self-heating.

Still another example of delay variation due to device history is the hot carrier effect, where the strong electric field across the gate insulator of a conducting FET cause carriers to be injected into the gate insulator and trapped, causing a gradual change in the device characteristics. The degree of degradation depends on the cumulative time the device has been in the on state, and as with NBTI, the time window over which history must be considered is much longer than for PD-SOI body history or switching-induced self-heating.

In all of the preceding cases, some aspect of the history (e.g., switching, state) of a circuit element (e.g., a wire or transistor) over some preceding period (e.g., several clock cycles, or the entire operating history of the device) causes an alteration in the delay of the device.

While sufficiently conservative to ensure working hardware, using a fast/slow delay range that accounts for the full range of possible device history is typically overly pessimistic. While in some cases it may be possible for the modeled fast/slow cases to simultaneously exist (and the timing must ensure functional hardware in this event), this will only rarely be the case. This pessimism places an artificial constraint on the performance of the integrated circuits (ICs) produced, scaling back the potential physical performance as a result of design tool limitations. Therefore, it is desirable to have an approach that can leverage any available device history knowledge in order to adjust the device history based delay component, typically with the goal of reducing pessimism.

One related art means of reducing pessimism in STA is through the Common Path Pessimism Removal (CPPR) approach described in U.S. Pat. Nos. 5,636,372 and 7,117,466. CPPR removes the part or all of the fast/slow delay difference from arrival time differences computed at timing tests between paths sharing common portions or parametric dependencies. However, CPPR requires enumeration of sub-paths with exponential complexity, typically allowing only a subset of all possible paths to be checked. As such, this approach is limited in application and is costly, and so it would be preferred to directly limit the pessimism in all tests during the base timing step. CPPR also applies only to pessimism due to correlations between delays in racing paths, while more refined knowledge of history may reduce the fast/slow delay range of a circuit independent of its involvement in any racing paths. Note that this would also reduce the number of tests and paths requiring CPPR as a result of the improved slacks it would generate in the base timing.

The illustrative aspects of the present disclosure are designed to solve the problems herein described and/or other problems not discussed.

BRIEF SUMMARY

A first aspect of the disclosure provides a method for the adjustment of the component(s) of delay variation attributable to device history during STA as a function of bounds on the device history, typically for pessimism reduction. These bounds may be typically inferred from the propagation of a signal with a bounded history, or propagated directly. This method may include steps for the propagation of the history bounds through the timing graph; evaluating if history bound propagation should terminate; calculation of an appropriate segment delay in the presence of the propagated bounds; and based on at least one of the evaluations, evaluating arrival times on the segment such that any allowed adjustment in the modeled delay variation as a function of history is provided. This adjustment includes scaling, the addition or subtraction of modifiers, a combination thereof, or any other operation that results in some change in the portion of delay attributable to device history.

A second aspect of the disclosure provides a program product stored on a computer readable medium, which when executed, provides for the adjustment of history based delay variation during static timing analysis of an integrated circuit design. In the second aspect, the program product may comprise: program code for obtaining information through sources of variability, including at least one of characterization and simulation, of one or more history based components of delay variability, and a relationship between the sources of variability and one or more bounded device histories; program code for inputting history bounds for at least one signal of the integrated circuit design; program code for computing and propagating history bounds through at least one first segment of the integrated circuit design to at least one signal of the integrated circuit design; program code for evaluating from at least one of the propagated history bounds, device history bounds for at least one second segment of the integrated circuit design; and program code for, based on the evaluated device history bounds, adjusting at least one of a value of the history based delay variability and propagation of timing through additional segments of the integrated circuit design.

A third aspect of the disclosure provides a system for the adjustment of history based delay variation during STA. In the third aspect, the system may include a processor; a memory; and a static timing engine stored in the memory. The static timing engine may include instructions operable to be executed by the processor and execute methods of the invention.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

In illustrative embodiments of the invention, the fractional component(s) of the overall delay attributable to various aspects of device history may be known, as is necessary for inclusion of these effects in the delay model. The related art describes mechanisms by which this history based delay variation occurs, and this knowledge is applied during timing model generation to arrive at the history contribution that accounts for history based delay variability. Then during STA, traditionally the full history based delay contribution is applied to account for the history based variability, which can be pessimistic as noted above. This is necessary as STA precludes the availability of any actual device history data. However, bounds may exist on the signal history of signals feeding a device, and hence on the amount of device history variation that is possible, and if these history bounds are introduced into the timing graph and propagated during timing, the history based delay contribution may be adjusted (typically reduced to provide pessimism reduction). The magnitude of the allowed adjustment as a function of the propagated signal history bounds may be determined using the same information that was originally used to generate the device history based delay component.

Figure 1:
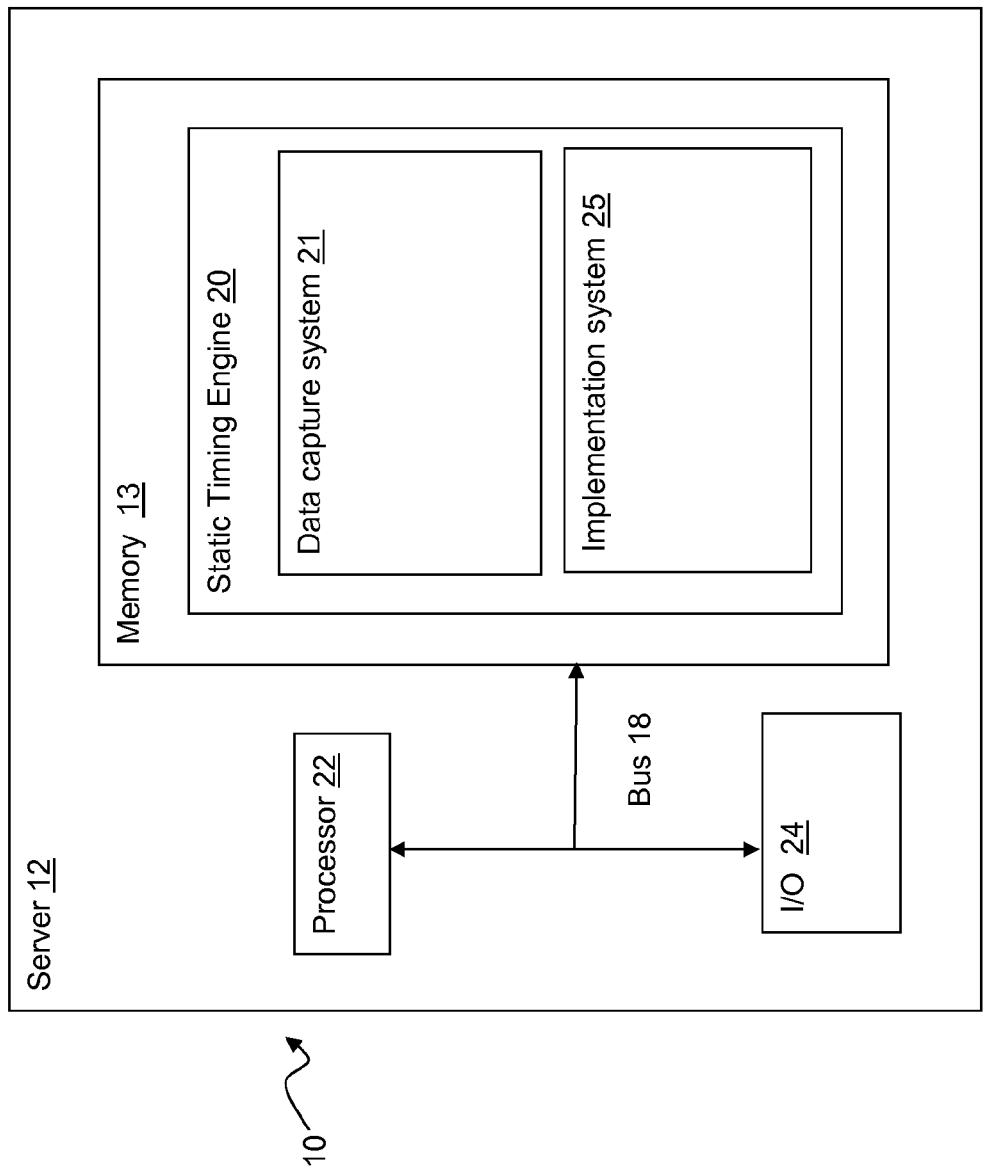
FIG. 1 shows an illustrative embodiment of a system for the adjustment of device history based delay variation during STA.

As indicated above, the disclosure provides a system and method for the adjustment of device history based delay variation during STA. FIG. 1 shows an illustrative embodiment of a system 10 for adjustment of history based delay variation during the static timing. The illustrative system 10 includes a server 12 having a static timing engine 20 stored in memory 13.

Server 12 may include any computer architecture that will enable the server 12 to communicate in a network by receiving and sending signals, such as a mainframe computer, desktop computer, Personal Digital Assistant (PDA), a cellular phone, a handheld computer, a Voice over Internet Protocol (VoIP) station, etc.

Server 12 may include a processor 22, an input/output (I/O) 24, and a memory 13 for storing static timing engine 20 (e.g., as a program product that can be executed by processor 22). As is known in the art, in general, processor 22 executes computer program code that is stored in memory 13. While executing computer program code, processor 22 can read and/or write data, such as history and timing data, to/from memory 13, and/or I/O interface 24. Bus 18 provides a communications link between each of the components in server 12. I/O device 24 can comprise any device that enables a user to interact with server 12 or any device that enables server 12 to communicate with one or more other computing devices. Input/output devices (including but not limited to keyboards, displays, pointing devices, etc.) can be coupled to the system either directly or through intervening I/O controllers.

In any event, server 12 can comprise any general purpose computing article of manufacture capable of executing computer program code installed by a user (e.g., a personal computer, server, handheld device, etc.). However, it is understood that server 12 is only representative of various possible equivalent computing devices that may perform the various process steps of the disclosure. To this extent, in other embodiments, server 12 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, system 10 is only illustrative of various types of computer infrastructures for implementing the disclosure. For example, in one embodiment, system 10 may comprise two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modems and Ethernet cards are just a few of the currently available types of network adapters. Regardless, communications between the computing devices may utilize any combination of various types of transmission techniques.

It is understood that some of the various systems shown in FIG. 1 can be implemented independently, combined, and/or stored in memory for one or more separate computing devices that are included in system 10. Further, it is understood that some of the systems and/or functionality may not be implemented, or additional systems and/or functionality may be included as part of system 10.

Static timing engine 20 may include a data capture system 21 and an implementation system 25 used, inter alia, to capture, manipulate, and implement data for modeling technologies that exhibit history based delay variation.

Figure 2:
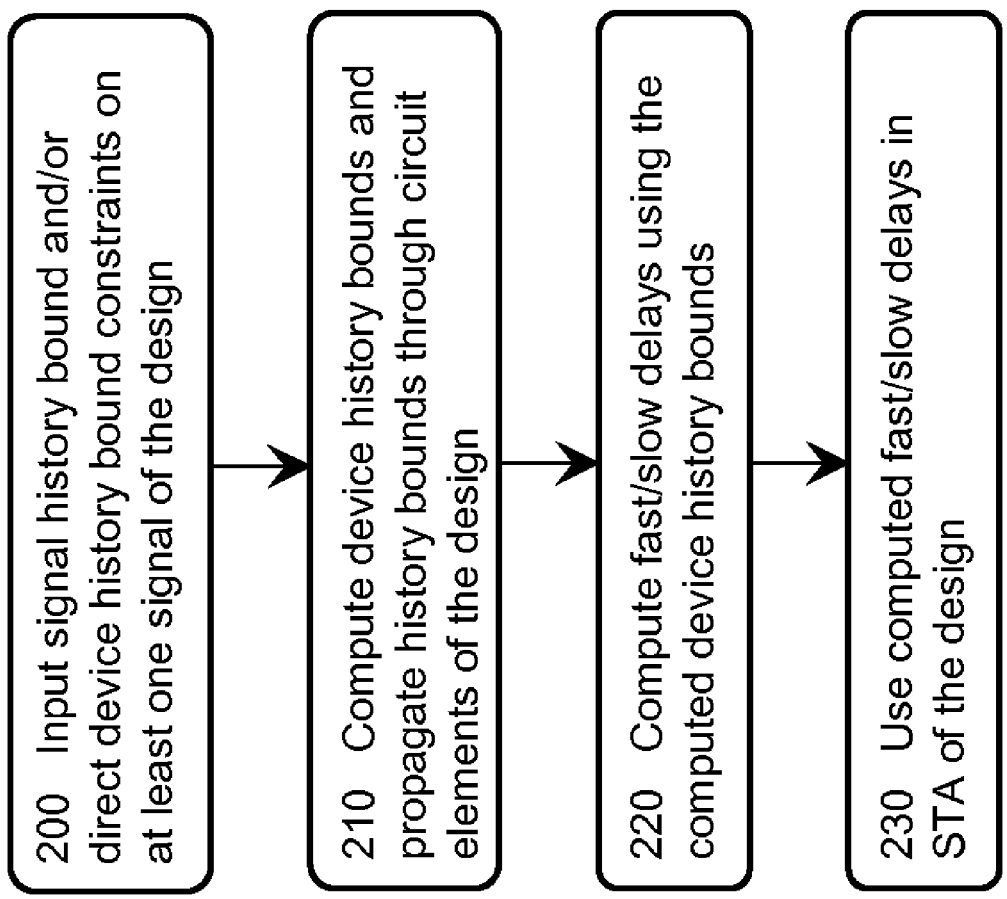
FIG. 2 shows an illustrative embodiment of a method in flowchart presentation for the adjustment of device history based delay variation during STA.

FIG. 2 shows an illustrative embodiment of a method in flowchart presentation for pessimism adjustment during the static timing of technologies that exhibit history based delay variation.

As shown in FIG. 2, in step 200 initial signal history bounds are input or asserted for at least one signal of a circuit design under analysis. These bounds may be input for primary inputs of the design. The form of this history bound may depend on the history-dependent variation effect being considered. For example, to account for delay variation due to PD-SOI body charge of voltage variation or hot-carrier effects, history bounds for a signal may comprise a minimum and maximum possible duty cycle of the signal during any period of time during which significant PD-SOI body charge influences due to a past device state may persist, or during the expected lifetime of the integrated circuit. The duty cycle of a digital signal is the fraction of the time the signal is high, or "true" during some specified period. For PD-SOI devices, this signal history can in turn be used to determine bounds on the period of time in which a PD-SOI device spent in certain states during any period of time during which significant PD-SOI body charge influences due to a past device state may persist. For hot carrier effects, this signal history may in turn be used to determine the fraction of the time that a device is turned on over an expected lifetime of the integrated circuit. To account for delay, variation due to switching-induced self-heating, or NBTI, history bounds may comprise upper and lower bounds on the number of switching events over any period of length comparable to the thermal time constant of the self-heated element or over the expected lifetime of the integrated circuit. For self-heating effects this signal history will directly give the switching rate of the device over any period of length comparable to the thermal time constant of the self-heated element. For NBTI effects, this signal history will directly give a switching rate for a device, normalized to a clock frequency, over the expected lifetime of the integrated circuit. In some circumstances, one may solely or additionally assert device history bound information directly. For example, some specific temperature information may be known for the region of the IC where the inputs apply, and this could also affect device history. A propagated signal history may also include information from which specific signal switching or duty cycle bounds may be deduced, e.g., whether a signal is a clock or data signal, or whether a clock signal is free running or potentially gated.

In a common case of a bounded signal history, a free running clock signal (one that oscillates continuously when the part is turned on) will typically have both upper and lower bounds of approximately 50% of its duty cycle. Such a clock signal will also typically have upper and lower bounds on its switching frequency equal to twice the clock frequency at which the clock oscillates (the signal has one rising and one falling transition during every clock period). Default history bound assumptions may apply to all signals that are not fed by other signals (e.g., primary inputs) and that do not have other explicit history bounds asserted. Typical default duty cycle bounds are from 0.0 (the signal is never high) to 1.0 (the signal is always high). Typical default switching frequency bounds are from 0.0 (the signal never switches) to the clock frequency (the signal switches once every clock period).

In step 210, device history bounds are determined from signal history bounds, and signal history bounds are propagated throughout the integrated circuit design. Such propagation may be limited to signals that are fed by other signals for which history bounds have been asserted or to which they have been propagated. Propagation may also typically terminate when a signal is reached for which a history assertion was input in step 200.

In step 220, the history bounds may be used to determine minimum and maximum delays for elements of the integrated circuit design. The manner in which delays are determined from history bounds depends on the type(s) of device history used and the history based delay variation type(s) being modeled. Methods for computing delays given particular device histories for PD-SOI devices, hot carrier effects, NBTI effects, and self-heating and other effects are known to those skilled in the art, and delay bounds may be computed by computing history-dependent delays at each extreme of the device history bounds. Finally, in step 230, these minimum and maximum delays are used in STA. These minimum and maximum delays may also be used in other contexts in which circuit delays are used, such as delay simulation or delay fault analysis. In some of these other applications, a single delay may be required rather than delay bound, in which case the minimum, maximum, mean, or other function of the delay bounds may be used.

Although steps 210, 220, and 230 are shown as separate, both history propagation of step 210 and the STA of step 230 require propagation of values (history bounds and arrival times respectively) throughout the integrated circuit design, and may be combined in a single traversal, with history bounds, delay bounds, and arrival times being computed for a particular gate or signal before computing these values on the gates it feeds.

Figure 3:
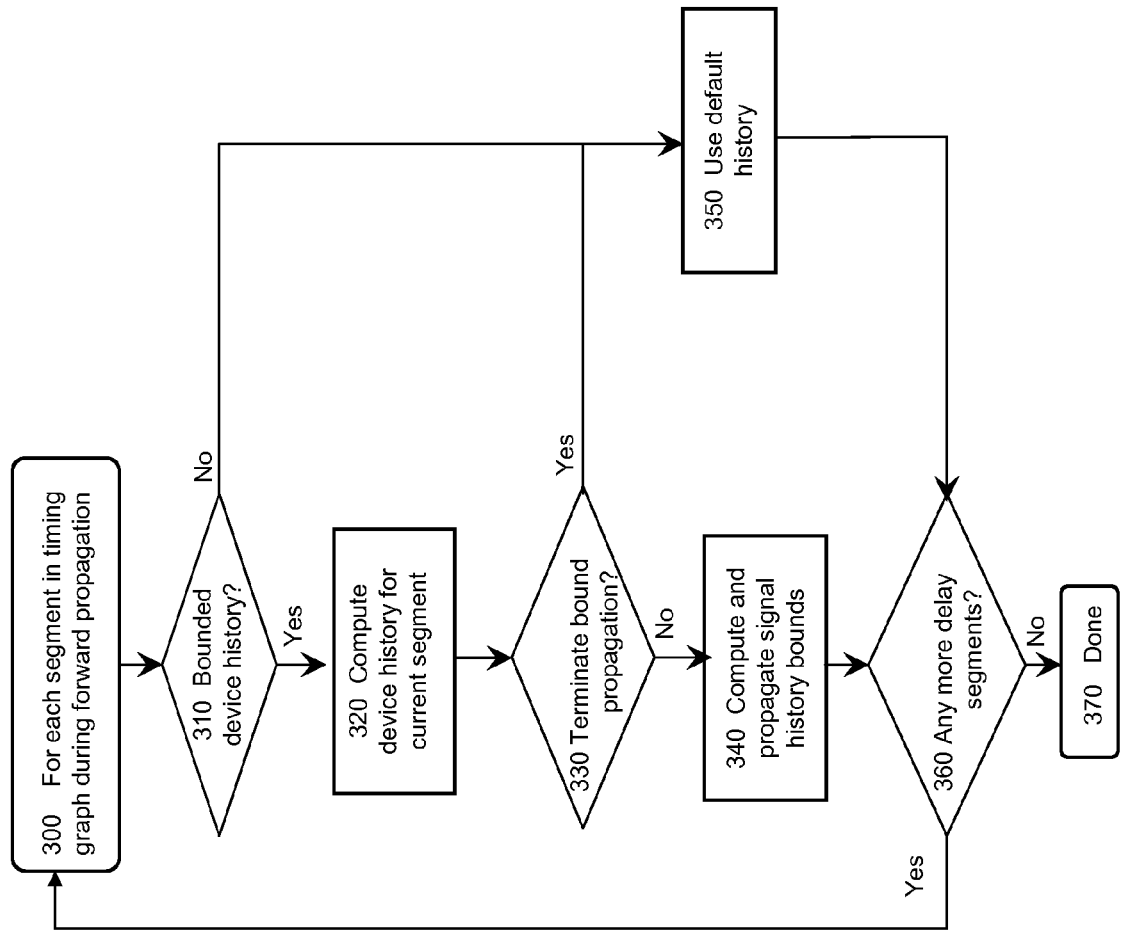
FIG. 3 shows a detailed illustrative embodiment of the history propagation and delay variation adjustment steps, first introduced in FIG. 2.

The signal history propagation of step 210 is shown in further detail in FIG. 3. As mentioned above, other configurations are not precluded by this description of exemplary embodiments. For each segment processed during a forward propagation step of block based static timing analysis (step 300), the following evaluations may be performed. In step 310, an evaluation may be made as to whether any input signal to the current segment may have a bounded history, either propagated or asserted. If at least one segment input may have a bounded history, the method proceeds to step 320. If no input of the segment has a bounded history, the method continues to step 350, where the default signal history bounds are used (these will result in the full range of possible history based delay variability in step 220 of FIG. 2). In this case, no device history bound computation or signal history bound propagation is required, and the method proceeds to step 360 where a determination is made as to whether there are any more delay segments to be considered. If so, the process returns to step 300 to process the next segment, otherwise it proceeds to step 370, terminating step 210 of FIG. 2 and proceeding to step 220.

In step 320, an evaluation occurs to compute the device history bounds for the devices comprising the segment delay. The specific device history and the manner in which it is computed from signal histories will depend on history based delay effects being modeled. For PD-SOI devices, this could be the range of possible charges or voltages on the device body. For NBTI or hot carrier effects, this could be the range of possible threshold voltage shifts caused by these effects. For self-heating this could be the range of possible temperatures of the device. Means for determining a device parameter (e.g., body charge, threshold voltage shift, or temperature) as a result of a particular set of signal histories (e.g., duty cycles or switching frequencies) on signals connected to the device are known to those skilled in the art. Bounds on device history can be computed by computing the relevant device parameter(s) at the extremes if the signal histories for the signals connected to the device.

In step 330, an evaluation may be made as to whether a condition exists which terminates the propagation of the signal history bounds. If the segment is found to have a terminating condition, the method continues to step 350. An example of a terminating condition in the PD SOI case would be the identification of a signal gating element which is capable of terminating the propagation of the necessary duty cycle information, introducing uncertainty regarding the duty cycle downstream from that element. An alternate example in the PD SOI case would be a user defined assertion indicating that the current segment terminates the propagation of bounded history, although it otherwise would not appear to do so, to facilitate certain design constraints (e.g., during hierarchical timing, in instances where only a subset of the design is being timed, and the signal coming on chip is known to be gated). This same example applies for termination of history bound propagation in the temperature based fluctuation, NBTI, and hot-carrier cases, as they similarly introduce uncertainty into the state of the signal history bounds. There may also be additional, case specific instances, for example bound propagation may be terminated for temperature based fluctuations if the signal enters some portion of the design that is known to be temperature controlled. A propagation continuation assertion may also be made on a segment, indicating that a condition that would normally terminate history propagation should be ignored, allowing the history propagation to continue through the segment.

If the segment is not found to have a terminating condition, the method continues to step 340, in which signal history bounds for the segment output are computed and propagated. Signal history may also include other information which can be used in computing and propagating signal histories of other signals. For example, signal transition at an input of an AND gate output cannot switch when another of its inputs is zero, and hence an upper bound on a duty cycle of an input to such a gate may be used in computing an upper bound on switching rate of the gate output. An example of an output signal history computation for duty cycle bounds affecting PD-SOI or hot carrier effects would be for an element that changes the duty cycle of an input signal in a controlled manner, e.g., gating off a clock (blocking propagation of clock signal transitions by forcing it to be held at zero or at one) for power reduction, causing a change in the device history bounds. If a clock signal which has a 50% duty cycle when free running is gated off by being forced to zero for some unknown fraction of the time, duty cycle bounds from 0% to 50% may be deduced for the clock signal. Similarly, if such a 50% duty cycle free running clock is gated off by being forced to one for some unknown fraction of the time, duty cycle bounds from 50% to 100% may be deduced for the clock signal. If bounds on the fraction of time that the clock is gated off over the relevant time period for the history effect being modeled are known, further refinement of the duty cycle bounds for the clock may be determined. Clock gating will also modify switching rate bounds used for NBTI and self-heating history effects. For effects such as PD-SOI history and self-heating in which the influence of history decays over time, the frequency of the input signal may contribute to the signal history. For a free running clock operating at a frequency greater than the reciprocal of the time constant for the PD-SOI body charge to vary once a steady state condition has been reached, hereafter referred to as the threshold frequency, there is no device history based delay variation. Under these conditions the slower acting effects of PD-SOI have reached steady state and are no longer varying, as they are balanced by the faster acting effects, which remain saturated above the threshold frequency. As the frequency decreases or as the signal periodicity varies below some threshold, the device history based delay variation increases, and must be accounted for during STA.

After the signal history bound propagation of step 340 is finished, the method proceeds to step 360 to determine whether other segments need to be processed.

Although steps 320 and 340 are shown as discrete steps, the delay modeling used to compute delay bounds in step 220 of FIG. 2 may instead model delay directly as a function of signal history, eliminating the need for the separate device history computation of step 320. Also, rather than requiring separate delay bound modeling to be performed for every possible signal history bound or resulting device history bound, delays or delay bounds may be pre-characterized as part of a delay model for particular history conditions. In the simplest case, the default delay models would be generated under steady state conditions of a free running clock with 50% duty cycle and frequency greater than or equal to the threshold frequency, and any additional history based delay variation that results in deviation from this state would be defined as the PD-SOI history effect delay contribution. Under these conditions the history bounds propagated could include: 1) information indicating if the signal is free running, and if so, 2) frequency information. If the signal is flagged as free running and is operating above the threshold frequency, any additional history based delay component may be totally eliminated for the current segment, as it is known that this variability does not exist. Alternatively, a function could be passed that maps the level of history based delay variability to frequency, which would provide full variability at low frequency and no variability above the threshold frequency with appropriate intermediate values, and this function would be applied to all free running signals to determine the appropriate history based delay contribution. In an alternative embodiment, the default condition under which no additional device history delay contribution is applied may not correspond to the steady state condition; it may instead, e.g., represent the condition which results in the slowest or fastest possible switching condition, e.g., a constant one (100% duty cycle) or zero (0% duty cycle) condition, to arrive at the fast/slow delays required for timing test race conditions. In this alternative embodiment, at least one additional delay characterization would preferably take place under steady state conditions (either one characterization above the threshold frequency, or multiple characterizations over a range including one above the threshold frequency). This information may be used to model the difference between the default modeled delay and the delay as it exists under free running conditions. This can then be applied to adjust the history based delay component to the appropriate propagated condition. Similar measurements would take place for temperature, NBTI, and hot carrier based delay variation to map the propagated bound information to the appropriate level of delay variation.

In illustrative embodiments, the specific adjustment applied to the device history based delay component may occur at any level of granularity available in STA, for example the adjustments may be global, delay mode specific, analysis mode specific, device family specific, clock phase specific, or instance specific. The history adjustment may occur via scaling, additive or subtractive operations, or other operations that alter the value of the history based component of delay variation. The history adjustment factors are assumed to be known, and may be obtained during model characterization, from separate simulation, from hardware measurement, or from some other analytic or heuristic approach.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method for adjustment of history-based delay variation during static timing analysis of an integrated circuit design, the method comprising:
    obtaining information through sources of variability, including at least one of characterization and simulation, of one or more history-based components of delay variability, and a relationship between the sources of variability and one or more bounded device histories;
    inputting history bounds for at least one signal of the integrated circuit design;
    computing and propagating history bounds through at least one first segment of the integrated circuit design to at least one signal of the integrated circuit design using at least one computing device;
    evaluating from at least one of the propagated history bounds, device history bounds for at least one second segment of the integrated circuit design; and
    based on the evaluated device history bounds, adjusting, using the at least one computing device, at least one of a value of the history-based delay variability and propagation of timing through additional segments of the integrated circuit design.

2. The method of claim 1, wherein the step of computing and propagating history bounds includes determining whether a propagation terminating condition exists for the at least one first segment.

3. The method of claim 2, further comprising proceeding directly to an evaluation of timing through the at least one first segment using a default history value in response to the at least one first segment being determined to have a propagation terminating condition.

4. The method of claim 2, wherein the step of determining whether a propagation terminating condition exists includes at least one of determining whether a propagation termination assertion exists, and determining whether a propagation continuation assertion overrides a normally terminating condition.

5. The method of claim 1, wherein the step of computing and propagating history bounds includes modifying a signal history propagated through the at least one first segment.

6. The method of claim 1, further comprising continuing to a next segment and repeating at least one of the evaluations for the next segment.

7. The method of claim 1, further comprising processing the segments during forward propagation of block based static timing analysis, wherein in response to the segments processed during forward propagation of block based static timing analysis being evaluated to not have a bounded history, further comprising proceeding directly to an evaluation of timing through the segments using a default history value.

8. The methods of claim 1, further comprising a step of history adjustment, wherein the history adjustment is at least one of global, delay mode specific, analysis mode specific, device family specific, clock phase specific, and instance specific.

9. The method of claim 1, wherein the one or more history-based components of delay variability includes PD-SOI body charge based delay variability.

10. The method of claim 1, wherein the one or more history-based components of delay variability includes NBTI based delay variability.

11. The method of claim 1, wherein the one or more history-based components of delay variability includes self-heating based delay variability.

12. The method of claim 1, wherein the one or more history-based components of delay variability includes hot carrier based delay variability.

13. A program product stored on a non-transitory computer readable medium, which when executed, provides for adjustment of history-based delay variation during static timing analysis of an integrated circuit design, the program product comprising:
    program code for obtaining information through sources of variability, including at least one of characterization and simulation, of one or more history-based components of delay variability, and a relationship between the sources of variability and one or more bounded device histories;
    program code for inputting history bounds for at least one signal of the integrated circuit design;
    program code for computing and propagating history bounds through at least one first segment of the integrated circuit design to at least one signal of the integrated circuit design;
    program code for evaluating from at least one of the propagated history bounds, device history bounds for at least one second segment of the integrated circuit design; and
    program code for, based on the evaluated device history bounds, adjusting at least one of a value of the history-based delay variability and propagation of timing through additional segments of the integrated circuit design.

14. The program product of claim 13, further comprising program code for determining whether a propagation terminating condition exists for the at least one first segment when computing and propagating history bounds.

15. The program product of claim 13, further comprising program code for modifying a signal history propagated through the at least one first segment when computing and propagating history bounds.

16. The program product of claim 13, further comprising program code for continuing to a next segment and repeating at least one of the evaluations for the next segment.

17. The program product of claim 13, further comprising program code processing the segments during forward propagation of block based static timing analysis, wherein in response to the segments processed during forward propagation of block based static timing analysis being evaluated to not have a bounded history, further comprising proceeding directly to an evaluation of timing through the segments using a default history value.

18. The program product of claim 13, further comprising program code for history adjustment, wherein the history adjustment is at least one of global, delay mode specific, analysis mode specific, device family specific, clock phase specific, and instance specific.

19. The program product of claim 13, further wherein the one or more history-based components of delay variability includes at least one of NBTI based delay variability, self-heating based delay variability, and hot carrier based delay variability.

20. A system for adjustment of history based delay variation during static timing analysis, the system comprising:
    a processor;
    a memory; and
    a static timing engine stored in the memory and operable to be executed by the processor, wherein the static timing engine is structured to:
        obtain information through sources of variability, including at least one of characterization and simulation, of one or more-history based components of delay variability, and a relationship between the sources of variability and one or more bounded device histories;
        input history bounds for at least one signal of an integrated circuit design;
        compute and propagate history bounds through at least one first segment of the integrated circuit design to at least one signal of the integrated circuit design;
        evaluate from at least one of the propagated history bounds, device history bounds for at least one second segment of the integrated circuit design; and
        based on the evaluated device history bounds, adjust at least one of a value of the history-based delay variability and propagation of timing through additional segments of the integrated circuit design.

* * * * *